(12) United States Patent
Wang et al.

(10) Patent No.: US 8,687,771 B2
(45) Date of Patent: *Apr. 1, 2014

(54) METHODS AND APPARATUS TO TEST A SUBSCRIBER LINE FOR A BROADBAND ACCESS SERVICE

(71) Applicant: AT&T Intellectual Property I, LP, Atlanta, GA (US)

(72) Inventors: Jin Wang, Fremont, CA (US); Kapil Shrikhande, Berkeley, CA (US)

(73) Assignee: AT&T Intellectutal Property I, LP, Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/711,862

(22) Filed: Dec. 12, 2012

(65) Prior Publication Data

US 2013/0108258 A1 May 2, 2013

Related U.S. Application Data

(63) Continuation of application No. 11/857,724, filed on Sep. 19, 2007, now Pat. No. 8,369,484.

(51) Int. Cl.
*H04M 1/24* (2006.01)
*H04M 3/08* (2006.01)
*H04M 3/22* (2006.01)

(52) U.S. Cl.
USPC .................... 379/1.04; 379/22.02; 379/31

(58) Field of Classification Search
USPC .......... 379/1.01, 1.03, 1.04, 22.02, 24, 27.02, 379/27.03, 27.08, 28, 29.01, 30, 31
See application file for complete search history.

(56) References Cited

U.S. PATENT DOCUMENTS

| | | |
|---|---|---|
| 4,071,704 A | 1/1978 | Moed |
| 4,815,119 A | 3/1989 | Mills |
| 5,553,059 A | 9/1996 | Emerson et al. |
| 5,917,885 A | 6/1999 | Berken et al. |
| 6,058,162 A | 5/2000 | Nelson et al. |
| 6,215,855 B1 | 4/2001 | Schneider |
| 6,278,769 B1 | 8/2001 | Bella |
| 6,366,644 B1 | 4/2002 | Sisk et al. |
| 6,373,923 B1 | 4/2002 | Williamson et al. |
| 6,477,238 B1 | 11/2002 | Schneider et al. |
| 6,490,342 B1 | 12/2002 | Dollinger |
| 6,519,323 B1 | 2/2003 | Hardy et al. |
| 6,553,098 B1 | 4/2003 | Harrison et al. |

(Continued)

OTHER PUBLICATIONS

United States Patent and Trademark Office, "Notice of Allowance," issued in connection with U.S. Appl. No. 11/857,724, mailed Oct. 5, 2012, 11 pages.

(Continued)

*Primary Examiner* — Quoc D Tran
(74) *Attorney, Agent, or Firm* — Hanley, Flight & Zimmerman, LLC.

(57) ABSTRACT

Methods and apparatus to test a subscriber line for a broadband access service are disclosed. An example network interface device (NID) comprises a tone generator to transmit a tone on a subscriber line to characterize the subscriber line while a DSL modem is providing a DSL service via the subscriber line, the tone having a frequency occurring within a range of frequencies in use by the DSL modem to provide the DSL service, and a pair of terminals to couple the DSL modem and the tone generator to the subscriber line.

20 Claims, 4 Drawing Sheets

(56) References Cited

U.S. PATENT DOCUMENTS

| | | |
|---|---|---|
| 6,584,148 B1 | 6/2003 | Zitting et al. |
| 6,718,019 B1 | 4/2004 | Heidari et al. |
| 6,798,866 B1 | 9/2004 | Tennyson et al. |
| 6,912,269 B2 | 6/2005 | Hardy et al. |
| 7,003,078 B2 | 2/2006 | Starr et al. |
| 7,072,391 B2 | 7/2006 | Oksman et al. |
| 7,076,030 B2 | 7/2006 | Bella et al. |
| 7,200,206 B1 | 4/2007 | Carbain |
| 8,369,484 B2 * | 2/2013 | Wang et al. .......... 379/1.04 |
| 2003/0135592 A1 | 7/2003 | Vetter et al. |
| 2006/0088141 A1 | 4/2006 | Starr et al. |
| 2006/0203898 A1 | 9/2006 | Oksman et al. |
| 2009/0074155 A1 | 3/2009 | Wang et al. |
| 2009/0168972 A1 | 7/2009 | Cioffi et al. |

OTHER PUBLICATIONS

United States Patent and Trademark Office, "Final Office Action," issued in connection with U.S. Appl. No. 11/857,724, mailed Apr. 13, 2012, 13 pages.

United States Patent and Trademark Office, "Non-Final Office Action", issued in connection with U.S. Appl. No. 11/857,724, mailed Aug. 8, 2011, 20 pages.

* cited by examiner

METHODS AND APPARATUS TO TEST A SUBSCRIBER LINE FOR A BROADBAND ACCESS SERVICE

CROSS REFERENCE TO RELATED APPLICATION

This patent is a continuation of and claims priority to U.S. application Ser. No. 11/857,724, filed Sep. 19, 2007, entitled "Methods and Apparatus to Test a Subscriber Line for a Broadband Access Service," which is hereby incorporated herein by reference in its entirety.

FIELD OF DISCLOSURE

This disclosure relates generally to broadband access services and/or systems and, more particularly, to methods and apparatus to test a subscriber line for a broadband access service.

BACKGROUND

Communication systems using digital subscriber line (DSL) technologies and/or passive optical network (PON) technologies are commonly utilized to provide Internet related services to subscribers, such as, for example, homes and/or businesses (also referred to herein as users, customers and/or customer-premises). PON technologies enable a service provider to efficiently provide a high data-rate broadband Internet network, broadband service and/or broadband content via fiber optic cables. DSL technologies enable customers to utilize telephone lines (e.g., ordinary twisted-pair copper telephone lines used to provide Plain Old Telephone System (POTS) services) to connect the customer to, for example, a high data-rate broadband Internet network, broadband service and/or broadband content. For example, a communication company and/or service provider may utilize a plurality of modems (e.g., a plurality of DSL modems) implemented by a DSL Access Multiplexer (DSLAM) at a central office (CO) to provide DSL communication services to a plurality of modems located at respective customer-premises. In general, a CO DSL modem receives broadband service content from, for example, a backbone server and forms a digital downstream DSL signal to be transmitted to a customer-premises DSL modem. Likewise, the central office DSL modem receives an upstream DSL signal from the customer-premises DSL modem and provides the data transported in the upstream DSL signal to the backbone server.

DETAILED DESCRIPTION

Methods and apparatus to test a subscriber line for a broadband access service are disclosed. A disclosed example network interface device (NID) includes a tone generator to transmit a tone on a subscriber line to characterize the subscriber line while a DSL modem is providing a DSL service via the subscriber line, the tone having a frequency occurring within a range of frequencies in use by the DSL modem to provide the DSL service, and a pair of terminals to couple the DSL modem and the tone generator to the subscriber line.

Another disclosed example network interface device (NID) includes a tone generator to generate a first optical signal, the first optical signal selected to identify the NID and having a wavelength occurring within a range of wavelengths in use by an optical network unit (ONU) coupled to the NID, and an optical coupler to combine the first optical signal with a second optical signal generated by the ONU.

A disclosed example loop tester includes a power meter to measure a power of a tone received on a subscriber line, the tone having a frequency occurring within a range of frequencies in use by a digital subscriber line (DSL) modem to provide a DSL service via the subscriber line, and a loop length estimator to estimate a length of the subscriber line based on the measured power.

A disclosed example method to identify a subscriber loop includes receiving a tone having a frequency occurring within a range of frequencies in use by a digital subscriber line (DSL) modem to provide a DSL service via the subscriber line, the tone transmitted by a tone generator located at a network interface device (NID), wherein the tone generator is distinct from the DSL modem, and demodulating the received tone to obtain a subscriber loop identifier.

In the interest of brevity and clarity, throughout the following disclosure references will be made to connecting a digital subscriber line (DSL) modem and/or a DSL communication service to a customer premises, customer and/or subscriber. However, it will be readily apparent to persons of ordinary skill in the art that connecting a DSL modem to a customer premises, customer and/or subscriber involves, for example, connecting a first DSL modem operated by a communications company (e.g., a central office (CO) DSL modem implemented by a DSL access multiplexer (DSLAM)) to a second DSL modem located at, for example, a customer-premises (e.g., a home and/or place of business owned, leased and/or operated by a customer) via a twisted-pair telephone line (i.e., a subscriber line). The customer-premises (e.g., the second) DSL modem may be further connected to other communication and/or computing devices (e.g., a personal computer, a set-top box, etc.) that the customer uses and/or operates to access a service (e.g., Internet access, Internet protocol (IP) Television (TV), etc.) via the CO DSL modem, the customer-premises DSL modem, the subscriber line and the communications company.

Moreover, while methods and apparatus to test a subscriber line for a DSL service and/or a passive optical network (PON) service are described herein, persons of ordinary skill in the art will readily appreciate that the example methods and apparatus may, additionally or alternatively, be used to test other wires and/or cables for other communication services. Other example wires and/or cables include, but are not limited to, those associated with public switched telephone network (PSTN) systems, public land mobile network (PLMN) systems (e.g., cellular), wireless distribution systems, wired or cable distribution systems, coaxial cable distribution systems, Ultra High Frequency (UHF)/Very High Frequency (VHF) radio frequency systems, satellite or other extra-terrestrial systems, cellular distribution systems, power-line broadcast systems, fiber optic networks, and/or any combination and/or hybrid of these devices, systems and/or networks.

Figure 1:
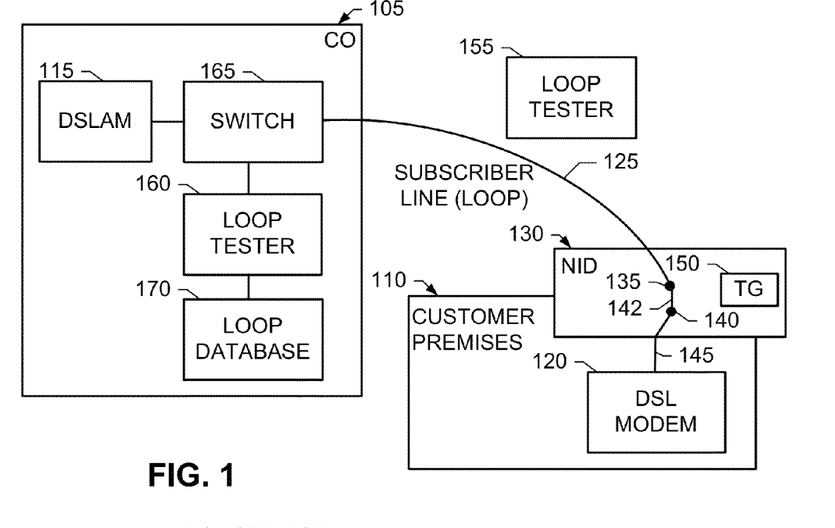
FIG. 1 is a schematic illustration of an example digital subscriber line (DSL) communication system constructed in accordance with the teachings of the invention.

FIG. 1 illustrates an example DSL communication system in which a central office (CO) 105 provides data and/or communication services (e.g., telephone services, Internet services, data services, messaging services, instant messaging services, electronic mail (email) services, chat services, video services, audio services, gaming services, etc.) to one or more customer-premises, one of which is designated at reference numeral 110. To provide DSL communication services to the customer-premises 110, the example CO 105 of FIG. 1 includes any number and/or type(s) of DSLAMs (one of which is designated at reference numeral 115) and the example customer-premises 110 includes any type of DSL modem 120. The example DSLAM 115 of FIG. 1 includes and/or implements one or more CO DSL modems (not shown) for respective ones of the customer-premises locations. The example DSLAM 115, the CO DSL modems comprising the DSLAM 115 and/or the example DSL modem 120 of FIG. 1 may be implemented, for example, in accordance with the ITU-T G.993.x family of standards for very high-speed DSL (VDSL).

In the illustrated example of FIG. 1, the DSLAM 115 provides the DSL service to the DSL modem 120 at the customer-premises 110 via a subscriber line 125. Subscriber lines are sometimes also referred to in the industry as "wire-pairs" and/or "loops." While throughout this disclosure reference is made to the example subscriber line 125 of FIG. 1, persons of ordinary skill in the art will readily appreciate that a subscriber line (e.g., the example subscriber line 125) used to provide a DSL service to a customer-premises location (e.g., the location 110) may include and/or be constructed from one or more segments of twisted-pair telephone wire (e.g., a combination of a feeder one (F1) cable, a distribution cable, a drop cable, and/or customer-premises wiring), terminals and/or distributions points (e.g., a serving area interface (SAI), a serving terminal, a vault and/or a pedestal). Such segments of twisted-pair telephone wire may be spliced and/or connected end-to-end, and/or may be connected at only one end thereby creating one or more bridged-taps. Regardless of the number, type(s), gauge(s) and/or topology of twisted-pair telephone wires used to construct the example subscriber line 125, it will be referred to herein in the singular form but it will be understood that it may refer to one or more twisted-pair telephone wire segments and may include one or more bridged taps.

As commonly used in the industry, the term "network demarcation point" denotes a location where cabling and/or equipment associated with a service provider (e.g., associated with the CO 105 and/or the DSLAM 115) is physically, electrically and/or communicatively coupled to cabling and/or equipment associated with a customer-premises, a subscriber, a user and/or a customer (e.g., the example DSL modem 120). Such subscriber cabling and/or equipment is often owned by the customer but may, in some instances, be owned, leased and/or otherwise provided by the service provider. Typically a network demarcation unit (e.g., a network interface device (NID) 130) is located at the network demarcation point (e.g., on the outside of an exterior wall of the customer-premises 110) to implement the physical, electrical and/or communicative coupling between the subscriber and service provider sides of the network demarcation point. The example NID 130 of FIG. 1 contains a first set of screw terminals, jacks and/or jumpers 135 to couple the subscriber line 125 to the NID 130, and contains a second set of screw terminals, jacks and/or jumpers 140 to couple subscriber cabling 145 to the NID 130. In such examples, a jumper and/or wire 142 couples the two sets of cabling 125 and 145 across the NID 130.

In some examples, to reduce and/or eliminate the effects of telephone wiring (not shown) within the customer-premises 110, the example DSL modem 120 is located and/or implemented at and/or within the NID 130. However, the DSL modem 120 need not be implemented at and/or within the NID 130. For example, the DSL modem 120 could be implemented elsewhere within the customer-premises 110. Alternatively, the DSL modem 120 may be partially implemented within the NID 130. For example, a device (e.g., a POTS splitter) may be installed and/or implemented within the NID 130 to isolate the effects of telephone wiring and/or telephones (not shown) located in the customer-premises 110 from the DSL modem 120.

Figure 4:
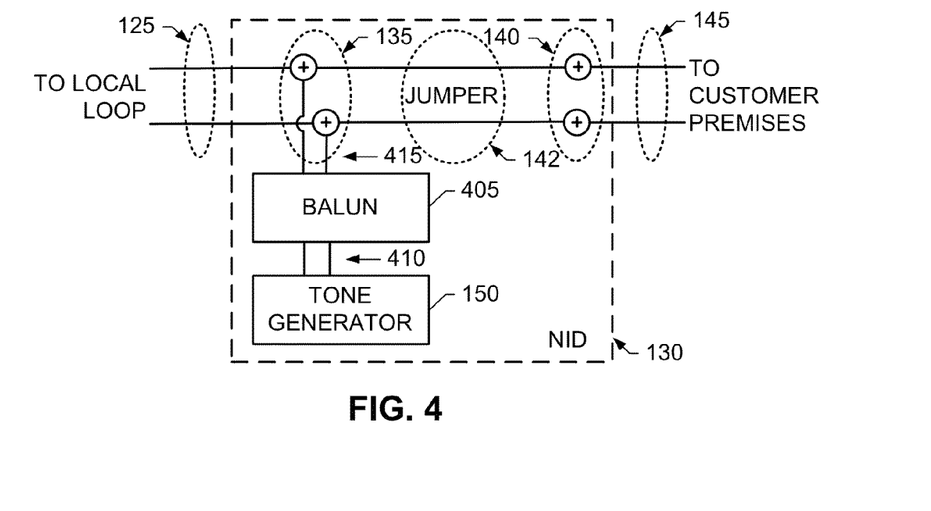
FIG. 4 illustrates an example manner of implementing the example network interface device (NID) of FIG. 1.

To facilitate testing of the example subscriber line 125, the example NID 130 of FIG. 1 includes a tone generator 150. The example tone generator (TG) 150 of FIG. 1 generates and transmits one or more signals (e.g., tones) on the subscriber line 125. The example tone generator 150 transmits the signals while the DSL modem 120 is operating to provide a DSL service. An example manner of implementing any or all of the example tone generators 150 of FIGS. 1 and/or 4 is described below in connection with FIG. 6.

Figure 2:
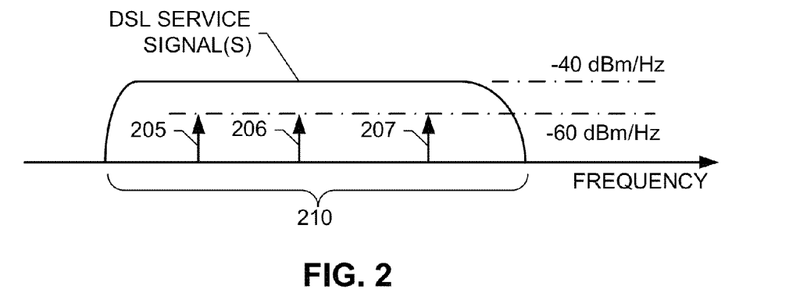
FIG. 2 illustrates example transmissions of tones by any or all of the example tone generators of FIGS. 1, 4 and/or 5.

As illustrated in FIG. 2, signal(s) 205, 206 and 207 generated by the example tone generator 150 of FIG. 1 may have frequencies that occur within a range of frequencies 210 used (e.g., transmitted and/or received) by the example DSL modem 120 to provide a DSL service at the customer premises 110. The example tone generator 150 transmits the signal(s) at power (e.g., signal) levels that provide for adequate and/or sufficiently accurate testing of the subscriber loop 125 while reducing the impact on DSL services. For example as illustrated in FIG. 2, the tone(s) generated by the example tone generator 150 are transmitted with a signal power level of −60 dBm/Hz, whereas the DSL signals 210 are transmitted with a nominal signal power level of −40 dBm/Hz, thereby causing only 1 or 2 DSL sub-carriers (e.g., a modulated 4.3125 thousand cycles per second (kHz) carrier of a DSL signal in accordance with the Telecommunication Standardization Sector of the International Telecommunications Union (ITU-T) G.dmt standard) to be disrupted by each of the example tone(s) 205-207.

Figure 3:
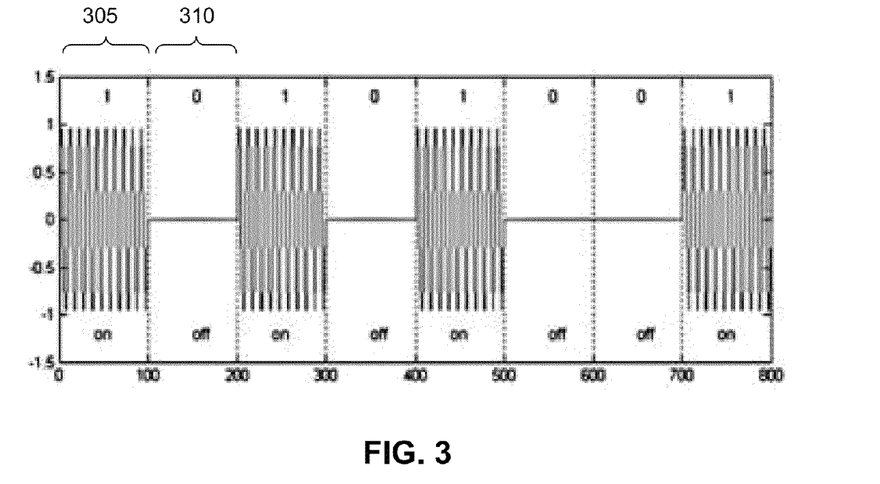
FIG. 3 illustrates an example modulation of a tone to provide an identifier.

In some examples, the signal(s) transmitted by the example tone generator 150 of FIG. 1 are encoded and/or modulated to facilitate identification of the tone generator 150, the NID 130, the subscriber loop 125, the customer premises 110, and/or a subscriber associated with the customer premises 110. For example as illustrated in FIG. 3, the signal(s) (e.g., tone(s)) may be amplitude modulated, where the amplitude(s) of the signal(s) during different time periods depend upon an identifier associated with a particular tone generator 150, a particular NID 130, a particular subscriber loop 125, a particular customer premises 110 and/or a particular subscriber. In the illustrated example of FIG. 3 an identifier comprising a bit sequence {1 0 1 0 1 0 0 1} is being transmitted. During a first time period 305 corresponding to the first bit of the sequence having a value of one (1), the signal is transmitted with an amplitude of one. During a second time period 310 corresponding to the second bit of the sequence having a value of zero (0), the signal is transmitted with an amplitude of zero (e.g., nothing is transmitted). Additionally or alternatively, the signal(s) may be modulated using phase modulation and/or code-division multiple-access (CDMA) modulation.

Turning to FIG. 4, signals generated and/or transmitted by the example tone generator 150 of FIG. 1 may be coupled to the subscriber line 125 via a coupling circuit and/or device, such as a balun 405. The example balun 405 of FIG. 4 is a passive circuit and/or component that matches impedances between two signals, and/or converts the unbalanced output 410 (e.g., a signal transported on a single conductor and a ground) of the tone generator 150 into a balanced signal 415 (e.g., a signal transported on two conductors and/or wires, with equal currents flowing in opposite directions) that may be coupled to the pair of terminals 135 without causing appreciable effects to existing and/or ongoing DSL and/or telephone services. An example balun 405 is Model No. 0707LB from North Hills™ Signal Processing, which converts between a 50 ohm ($\Omega$) impedance unbalanced signal 410 and a 600$\Omega$ impedance balanced signal 415 suitable for coupling onto a twisted-pair telephone line. Additionally or alternatively, the signals 410 generated and/or transmitted by the tone generator 150 may be coupled directly to the pair of terminals 135 without use of an intervening coupling circuit and/or device. The example tone generator 150 and/or the example balun 405 may be implemented, included and/or operated at the NID 130 even when no customer wiring 145 and/or customer premises devices (e.g., the DSL modem 120 and/or a telephone) are coupled to the NID 130.

Returning to FIG. 1, to test the example subscriber line 125 using signals transmitted by the example tone generator 150, the example DSL communication system of FIG. 1 includes one or more loop testers, two of which are designated at reference numerals 155 and 160. The example loop testers 155 and 160 of FIG. 1 may be battery-operated, portable and/or handheld devices useable by a technician, installer and/or service person to test the subscriber line 125, and may be used a) outside and/or within the customer-premises 110, b) outside and/or within the CO 105, and/or c) anywhere along the subscriber loop 125 (e.g., at a wiring cabinet and/or wiring pedestal). Additionally or alternatively, the example loop testers 155 and/or 160 of FIG. 1 may be a substantially fixed-location devices implemented within the CO 105 (e.g., implemented within a rack of equipment) and operable and/or configurable to test the subscriber loop 125 and/or any number of additional or alternative subscriber loops (not shown). In such instances, the example loop tester 155, 160 may be coupled to the subscriber loop 125 via a switch 165 (e.g., a switch manufactured by Spirent® Communications), which is configurable to connect, at any particular time, any one of a plurality of subscriber loops (e.g., the example subscriber loop 125) to the example loop tester 160. An example manner of implementing any or all of the example loop testers 155 and 160 of FIG. 1 is described below in connection with FIG. 6.

The example loop testers 155 and 160 of FIG. 1 measure the power at which signals transmitted by the example tone generator 150 are received at the loop tester 155, 160. For example, the loop tester(s) 155 and/or 160 may measure the attenuation of one or more of the tones transmitted by the tone generator 150. The example loop tester(s) 155 and/or 160 then uses the measured attenuation (s) to estimate the loop loss of the subscriber loop 125 and/or to estimate the length of the subscriber loop 125. For example, using a database (e.g., table) that associates, for a particular frequency, signal attenuation values with loop lengths, the loop tester(s) 155 and/or 160 can determine (e.g., estimate) a length of the subscriber line 125. If more than one signal attenuation value (e.g., at more than one of the example frequencies 205-207 of FIG. 2) is measured, the loop testers 155 and 160 can estimate a loop length based on each of the signal attenuations, and then average the estimated loop lengths to obtain a single estimated loop length. Other methods and apparatus to estimate loop lengths given one or more signal attenuation values are described in U.S. patent application Ser. No. 11/751,353, filed on May 21, 2007, and entitled "Methods and Apparatus to Characterize a Digital Subscriber Line (DSL) Subscriber Loop." U.S. patent application Ser. No. 11/751,353 is hereby incorporated by reference in its entirety.

To store data and/or information associated with subscriber lines, the example DSL communication system of FIG. 1 includes a loop database 170. The example loop database 170 of FIG. 1 stores a plurality of database records for respective ones of a plurality of subscriber lines (e.g., the example subscriber line 125). Example information that may be stored in a database record includes, but is not limited to, an estimated loop length, DSL connection rate, error rates, signal attenuation, signal-to-noise ratios, bit allocations, DSL modem configuration, etc. When the example loop tester(s) 155 and/or 160 of FIG. 1 estimate a loop length for a subscriber line, they may update the corresponding database record in the loop database 170. Such updates may occur when the estimation is performed, and/or may be stored by and/or within the loop tester 155, 160 and then used to update the loop database 170 at a later time. Although this disclosure references multiple loop testers 155 and 160, the measurements and/or estimations discussed herein may be accomplished with one or more loop testers.

Figure 5:
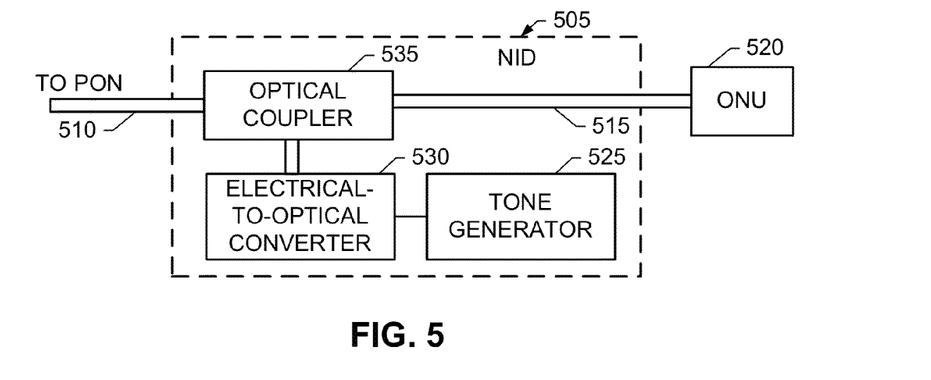
FIG. 5 illustrates an example manner of implementing a network interface device for a passive optical network (PON).

FIG. 5 illustrates an example manner of implementing a NID 505 for a PON. The example NID 505 of FIG. 5 optically couples optical signals between a PON subscriber line 510 and a customer premises optical cable 515. The example customer premises optical cable 515 may be, for example, coupled to an optical network unit (ONU) 520 located within a customer premises (not shown).

To facilitate testing of the example PON subscriber line 510 and/or to facilitate identification of the NID 505, the example ONU 520, a subscriber, and/or a customer premises, the example NID 505 of FIG. 5 includes the example tone generator 525, an electrical-to-optical converter 530 and an optical coupler 535. The example tone generator 525 of FIG. 5 generates and transmits one or more optical signals (e.g., tones) on the PON subscriber line 510. The example tone generator 525 transmits the signals while the ONU 520 is operating. As described above in connection with FIG. 2, the example tone generator 525 transmits optical signals 205-207 falling within a range of optical wavelengths 210 in use by the example ONU 520. Moreover as described above in connection with FIG. 3, the optical signal(s) transmitted by the example tone generator 525 may be modulated (e.g., amplitude modulated, phase modulated, CDMA modulated and/or otherwise) to convey one or more identifiers associated with the example NID 505, the example ONU 520, a subscriber, and/or a customer premises. An example manner of implementing the example tone generator 525 of FIG. 5 is described below in connection with FIG. 6.

Figure 6:
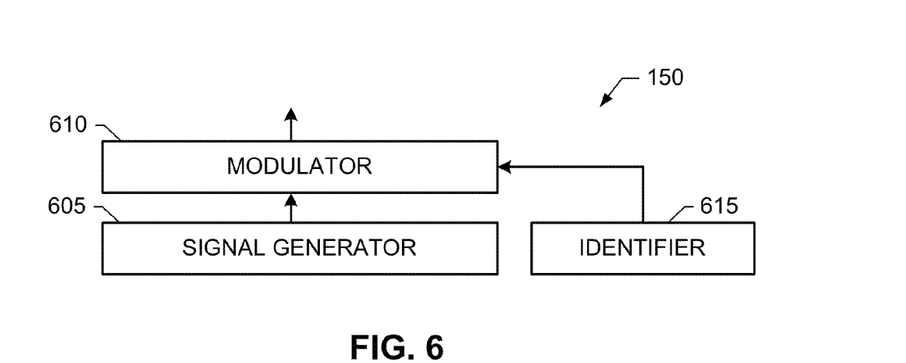
FIG. 6 illustrates an example manner of implementing any or all of the example tone generators of FIGS. 1, 4 and/or 5.

FIG. 6 illustrates an example manner of implementing any or all of the example tone generators 150 and/or 525 of FIGS. 1, 4 and/or 5. While any or all of the example tone generators 150 and/or 525 may be represented by the device of FIG. 6, for ease of discussion, the example device of FIG. 6 is referred to as tone generator 150. To generate one or more tones, the example tone generator 150 of FIG. 6 includes a signal generator 605. Using any type(s) and/or numbers of device, circuits, logic, method(s) and/or algorithm(s), the example signal generator 605 of FIG. 6 generates one or more tones. How many and/or the frequencies of the generated tones generated by the example signal generator 605 are pre-configured and/or built into the example tone generation module 605. However, the generation of tones by the example signal generator 605 may be programmable and/or configurable.

To modulate signals, the example tone generator 150 of FIG. 6 includes a modulator 610 and an identifier 615. Using any modulation technique (e.g., amplitude, phase, CDMA and/or otherwise), circuit(s), logic, devices and/or algorithm(s), the example modulator 610 modulates one or more of the tones generated by the example signal generator 605. An example modulation that may be implemented by the example modulator 610 is described above in connection with FIG. 3.

While an example manner of implementing any or all of the example tone generators 150 and/or 525 of FIGS. 1, 4 and/or 5 has been illustrated in FIG. 6, one or more of the elements, processes and/or devices illustrated in FIG. 6 may be combined, divided, re-arranged, omitted, eliminated and/or implemented in any other way. Further, the example signal generator 605, the example modulator 610 and/or, more generally, the example tone generator 150 of FIG. 6 may be implemented by hardware, software, firmware and/or any combination of hardware, software and/or firmware. Further still, the example tone generator 150 of FIG. 6 may include one or more elements, processes and/or devices in addition to, or instead of, those illustrated in FIG. 6, and/or may include more than one of any or all of the illustrated elements, processes and devices.

Figure 7:
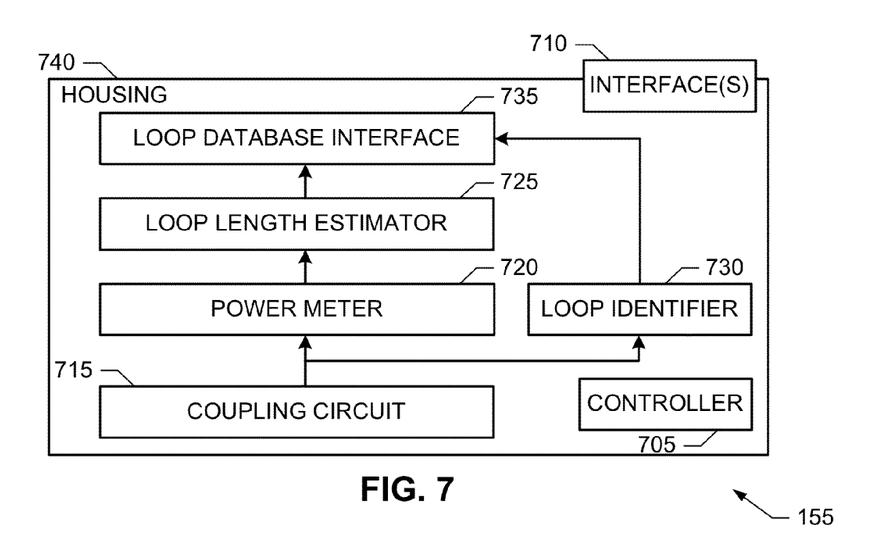
FIG. 7 illustrates an example manner of implementing any or all of the example loop testers of FIG. 1.

FIG. 7 illustrates an example manner of implementing any or all of the example loop testers 155 and 160 of FIG. 1. While either of the example loop testers 155 and 160 may be represented by the example device of FIG. 7, for ease of discussion, the example device of FIG. 7 will be referred to as loop tester 155. To direct the operations of the example loop tester 155 of FIG. 7, the loop tester 155 includes any type of controller 705. The example controller 705 of FIG. 7 may be one or more of any type of processors such as, for example, a microprocessor, a microcontroller, a processor core, a digital signal processor (DSP), a DSP core, an advanced reduced instruction set computing (RISC) machine (ARM) processor, etc. The example controller 705 executes coded instructions which may be present in a memory (not shown) of the controller 705 (e.g., within a random-access memory (RAM) and/or a read-only memory (ROM)) and/or within an on-board memory of the controller 705. For example, the example machine accessible instructions of FIG. 8 may be executed by the controller 705 to direct the loop tester 155 to test a subscriber line for a communication service.

To allow a person to operate the example loop tester 155 of FIG. 7, the loop tester 155 of FIG. 7 includes any number and/or type(s) of interfaces 715. In general, the example interface(s) 710 of FIG. 7 are used to initiate testing and/or identification of a subscriber line, and/or to obtain testing and/or identification results. Example interface(s) 710 include, but are not limited to, any number of button(s), key(s), keypad(s), screen(s), display(s), light emitting diode(s), etc. Additionally or alternatively, the example interface 715 of FIG. 7 may be implemented and/or provided by an operating system executed by the example controller 705. For example, if a loop tester 155 is implemented by, within and/or in conjunction with a portable computing device (e.g., a laptop and/or personal digital assistant), the interfaces 710 may be implemented by the portable computing device and/or an operating system executing on the controller 705. If a loop tester 155 is implemented within, for example, a rack of equipment, the example interface(s) 715 may be an application programming interface (API) via which the loop tester 155 can be controlled by other equipment. The example interface(s) 715 may, additionally or alternatively, be used to, for example, control the example switch 165 of FIG. 1 to select a specific subscriber line to be coupled to the loop tester 155.

To couple a received signal to the example loop tester 155 of FIG. 7, the example loop tester 155 includes a coupling circuit 715. Example coupling circuits 715 include, but are not limited to a balun, an antenna and/or an optical-to-electrical converter. A balun 715 may be used to electrically couple a twisted-wire pair subscriber line to the loop tester 155. An antenna 715 may be used to couple radio waves emitted by a subscriber line to the loop tester 155. For example, the loop tester 155 may not be electrically or optically connected to a given subscriber line, but instead may need only be near to a subscriber line to be tested and/or identified. An optical-to-electrical converter 715 may be used to convert an optical signal on a PON to an electrical signal and to couple the electrical signal to the loop tester 155.

To measure received signal power, the example loop tester 155 of FIG. 7 includes a power meter 720. Using any number of circuit(s), device(s), logic, algorithm(s) and/or method(s), the example power meter 720 measures the received signal power of one or more received signals (e.g., one or more received tones).

To estimate a loop length, the example loop tester 155 of FIG. 7 includes a loop length estimator 725. The example loop length estimator 725 of FIG. 1 uses received signal power values measured by the example power meter 720 to estimate the length of a subscriber loop (e.g., the example subscriber loop 125 of FIG. 1). Knowing the transmitted signal level of a tone (e.g., −20 dBm/Hz), the example loop length estimator 725 can determine the attenuation of the tone. Then, for example, the loop length estimator 725 can use a database (e.g., table) that associates, for a particular frequency, signal attenuation values with loop lengths to determine (e.g., estimate) a length of the subscriber line. If more than one signal attenuation value is available (possibly for more than one frequency), the loop length estimator estimates a loop length based on each of the signal attenuations, and then averages the estimated loop lengths to obtain a single estimated loop length. Other methods and apparatus to estimate loop lengths given one or more signal attenuation values are described in U.S. patent application Ser. No. 11/751,353, filed on May 21, 2007, and entitled "Methods and Apparatus to Characterize a Digital Subscriber Line (DSL) Subscriber Loop."

To identify a device, customer-premise and/or subscriber associated with a received signal, the example loop tester 155 of FIG. 7 includes a loop identifier 730. The example loop identifier 730 demodulates (e.g., using amplitude demodulation, phase demodulation and/or CDMA demodulation) one or more received signals to decode an identifier associated with a NID, an ONU, a DSL modem, a tone generator, a subscribe line, a customer premises and/or a subscriber.

To store test and/or identification results, the example loop tester 155 of FIG. 7 include a loop database interface 735. The example loop database interface 735 allows the loop tester 155 to store estimated loop lengths and associated identifiers in a database (e.g., the example loop database 165 of FIG. 1). Database updates may be performed when a loop length and/or identifier is determined, and/or may be stored by the loop database interface 735 for subsequent storage in the database.

The example loop tester 155 of FIG. 7 is contained and/or implemented within a housing 740. The example housing 740 of FIG. 7 has a form factor of a battery-powered portable and/or handheld device. However, the example housing 750 may have other form factors. For example, the housing 750 may be a rack mountable device suitable for use and/or installation within a central office and/or DSLAM. Additionally or alternatively, the housing 750 may have a form factor suitable for mechanical and/or electrical connection to a portable computing device such as a laptop computer and/or personal digital assistant.

While an example manner of implementing any or all of the example loop testers 155 and 160 of FIG. 1 has been illustrated in FIG. 7, one or more of the elements, processes and/or devices illustrated in FIG. 7 may be combined, divided, re-arranged, omitted, eliminated and/or implemented in any other way. Further, the example interface(s) 710, the coupling circuit 715, the example power meter 720, the example loop length estimator 725, the example loop identifier 730, the example loop database interface 735 and/or, more generally, the example loop tester 155 of FIG. 7 may be implemented by hardware, software, firmware and/or any combination of hardware, software and/or firmware. Further still, the example loop tester 155 of FIG. 7 may include one or more elements, processes and/or devices in addition to, or instead of, those illustrated in FIG. 7, and/or may include more than one of any or all of the illustrated elements, processes and devices.

Figure 8:
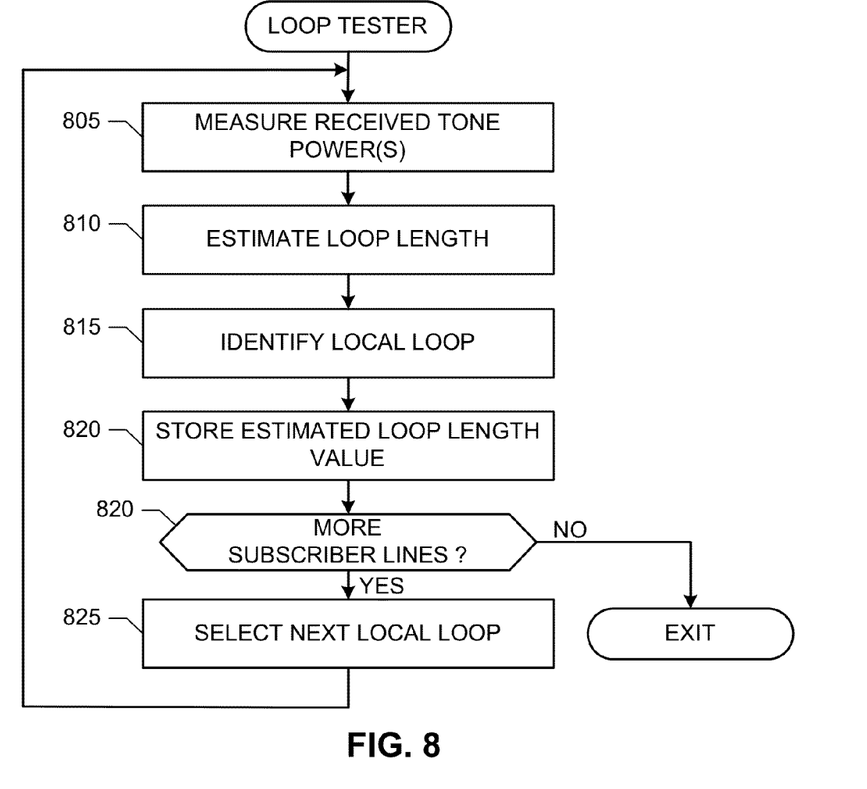
FIG. 8 is a flowchart representative of an example process that may be carried out by, for example, a processor to implement any or all of the example loop testers of FIGS. 1 and/or 7.

FIG. 8 is a flowchart representative of machine accessible instructions that may be carried out to test one or more subscriber lines for a DSL service using any of the example subscriber testers 155 and 160 of FIGS. 1 and/or 7. The example machine accessible instructions of FIG. 8 may be carried out by a processor, a controller and/or any other suitable processing device. For example, the example machine accessible instructions of FIG. 8 may be embodied in coded instructions stored on a tangible medium such as a flash memory, a ROM and/or RAM associated with a processor (e.g., the example processor 905 discussed below in connection with FIG. 9). Alternatively, some or all of the example machine accessible instructions of FIG. 8 may be implemented using any combination(s) of application specific integrated circuit(s) (ASIC(s)), programmable logic device(s) (PLD(s)), field programmable logic device(s) (FPLD(s)), discrete logic, hardware, firmware, etc. Also, some or all of the example machine accessible instructions of FIG. 8 may be implemented manually or as any combination of any of the foregoing techniques, for example, any combination of firmware, software, discrete logic and/or hardware. Further, although the example operations of FIG. 8 are described with reference to the flowchart of FIG. 8, persons of ordinary skill in the art will readily appreciate that many other methods of implementing the operations of FIG. 8 may be employed. For example, the order of execution of the blocks may be changed, and/or one or more of the blocks described may be changed, eliminated, sub-divided, or combined. Additionally, persons of ordinary skill in the art will appreciate that any or all of the example machine accessible instructions of FIG. 8 may be carried out sequentially and/or carried out in parallel by, for example, separate processing threads, processors, devices, discrete logic, circuits, etc.

The example machine accessible instructions of FIG. 8 begin with a loop tester (e.g., the power meter 720 of FIG. 7) measuring the received signal level of a received signal (block 805). The loop tester (e.g., the example loop length estimator 725) then estimates the length of the subscriber line on which the signal was received (block 810). The loop tester (e.g., the example loop identifier 730) then demodulates the received signal to obtain an identifier used to modulate the received signal (block 815). Next, the loop tester (e.g., the example loop database interface 735) stores the estimate loop length and any determineed identifier in a database (e.g., the example database 170 of FIG. 1) and/or within the loop tester for later storage in the database (block 820). If more subscriber loops are to be tested and/or identified (block 820), the loop tester (e.g., the example controller 705) directs a switch (e.g., the example switch 165) to couple the next subscriber line to the loop tester (block 830). Control then returns to block 805 to measure a received signal level on the next subscriber line. If no more subscriber lines are to be tested and/or identified (block 820), control exits from the example machine accessible instructions of FIG. 8.

Figure 9:
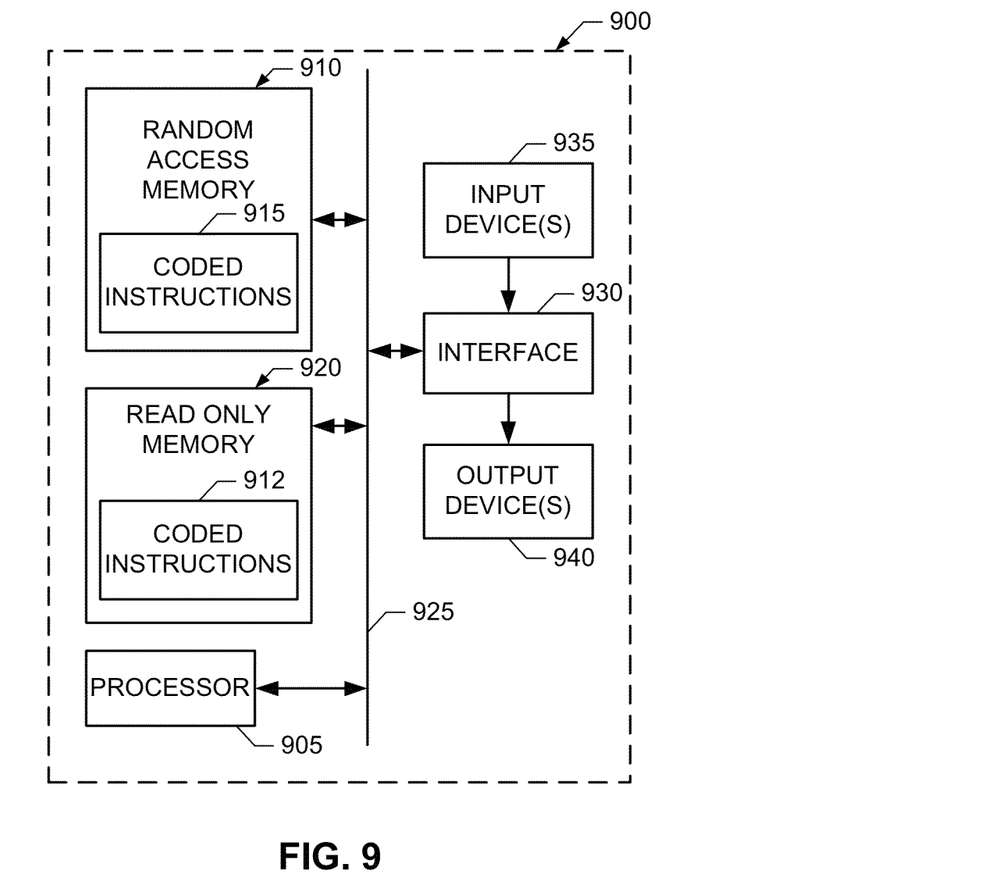
FIG. 9 is a schematic illustration of an example processor platform that may be used and/or programmed to execute the example machine accessible instructions of FIG. 8 to implement any or all of the example loop testers described herein.

FIG. 9 is a schematic diagram of an example processor platform 900 that may be used and/or programmed to implement any portion(s) and/or all of the example tone generator 150 and/or 525 of FIGS. 1, 4 and/or 5, and/or the example loop testers 155 and 160 of FIGS. 1 and/or 7. For example, the processor platform 900 can be implemented by one or more processors, processor cores, microcontrollers, DSPs, DSP cores, ARM processors, ARM cores, etc.

The processor platform 900 of the example of FIG. 9 includes at least one programmable processor 905. The processor 905 executes coded instructions 910 and/or 912 present in main memory of the processor 905 (e.g., within a RAM 915 and/or a ROM 920). The processor 905 may be any type of processing unit, such as a processor core, a processor and/or a microcontroller. The processor 905 may execute, among other things, the example machine accessible instructions of FIG. 8 to implement any or all of the example loop testers described herein. The processor 905 is in communication with the main memory (including a ROM 920 and/or the RAM 915) via a bus 925. The RAM 915 may be implemented by DRAM, SDRAM, and/or any other type of RAM device, and ROM may be implemented by flash memory and/or any other desired type of memory device. Access to the memory 915 and 920 may be controlled by a memory controller (not shown).

The processor platform 900 also includes an interface circuit 930. The interface circuit 930 may be implemented by any type of interface standard, such as a USB interface, a Bluetooth interface, an external memory interface, serial port, general purpose input/output, etc. One or more input devices 935 and one or more output devices 940 are connected to the interface circuit 930. The input devices 935 and/or output devices 940 may be used to implement the loop database interface 735 of FIG. 7.

Of course, persons of ordinary skill in the art will recognize that the order, size, and proportions of the memory illustrated in the example systems may vary. Additionally, although this patent discloses example systems including, among other components, software or firmware executed on hardware, it will be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, persons of ordinary skill in the art will readily appreciate that the above described examples are not the only way to implement such systems.

At least some of the above described example methods and/or apparatus are implemented by one or more software and/or firmware programs running on a computer processor. However, dedicated hardware implementations including, but not limited to, an ASIC, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

It should also be noted that the example software and/or firmware implementations described herein are optionally stored on a tangible storage medium, such as: a magnetic medium (e.g., a disk or tape); a magneto-optical or optical medium such as a disk; or a solid state medium such as a memory card or other package that houses one or more read-only (non-volatile) memories, random access memories, or other re-writable (volatile) memories; or a signal containing computer instructions. A digital file attachment to e-mail or other self-contained information archive or set of archives is considered a distribution medium equivalent to a tangible storage medium. Accordingly, the example software and/or firmware described herein can be stored on a tangible storage medium or distribution medium such as those described above or equivalents and successor media.

To the extent the above specification describes example components and functions with reference to particular devices, standards and/or protocols, it is understood that the teachings of the invention are not limited to such devices, standards and/or protocols. Such systems are periodically superseded by faster or more efficient systems having the same general purpose. Accordingly, replacement devices, standards and/or protocols having the same general functions are equivalents which are intended to be included within the scope of the accompanying claims.

Although certain example methods, apparatus and articles of manufacture have been described herein, the scope of coverage of this patent is not limited thereto. On the contrary, this patent covers all methods, apparatus and articles of manufacture fairly falling within the scope of the appended claims either literally or under the doctrine of equivalents.

What is claimed is:

1. A network interface device comprising:
a memory comprising machine readable instructions;
a processor which, when executing the instructions performs operations comprising:
transmitting an optical signal associated with a tone having a first amplitude based on an identifier on a passive optical network subscriber line to characterize the passive optical network subscriber line while a digital subscriber line modem is providing a service via the subscriber line, the tone having a frequency occurring within a range of frequencies in use by the digital subscriber line modem to provide the service, the tone transmitted with a signal power level lower than a power associated with the service, and the tone to identify the digital subscriber line modem associated with the network interface device; and
communicatively coupling, with an optical coupler, the digital subscriber line modem and the processor to the subscriber line.

2. A network interface device as defined in claim 1, wherein the identification of the digital subscriber line modem is performed at an intermediate point of the passive optical network subscriber line.

3. A network interface device as defined in claim 1, wherein the identification of the digital subscriber line modem is performed at one of a central office or a remote terminal.

4. A network interface device as defined in claim 1, wherein the tone has a signal level selected to reduce interference with the digital subscriber line modem.

5. A network interface device as defined in claim 1, wherein the tone is a first tone having a first frequency, and the operations further comprise transmitting a second tone on the passive optical network subscriber line, the second tone having a second frequency occurring within the range of frequencies in use by the digital subscriber line modem to provide the service.

6. A network interface device as defined in claim 1, wherein the processor is to control:
a signal generator to generate the tone; and
a modulator to modulate the generated tone with the identifier.

7. A loop tester comprising:
a memory comprising machine readable instructions; and
a processor which, when executing the instructions performs operations comprising:
measuring a power of a tone received by an optical coupler on a passive optical network subscriber line, the tone having a first amplitude based on an identifier associated with a tone generator, the tone having a frequency occurring within a range of frequencies in use by a digital subscriber line modem to provide a service via the passive optical network subscriber line;
verifying the power level of the tone is lower than a power associated with the service;
demodulating the received tone to identify the digital subscriber line modem; and
estimating a length of the passive optical network subscriber line based on the measured power.

8. A loop tester as defined in claim 7, further comprising a loop database interface to store the estimated length and the identifier in a database.

9. A loop tester as defined in claim 7, wherein the operations further comprise measuring a second power of a second tone received on the passive optical network subscriber line while the digital subscriber line modem is providing the service, and estimating the length based on the measured power and the second measured power.

10. A loop tester as defined in claim 7, further comprising an optical-to-electrical converter to communicatively couple the optical coupler to the passive optical network subscriber line to a power meter.

11. A method to identify a subscriber loop, the method comprising:
accessing a tone converted from a passive optical network subscriber line, the tone having a first amplitude based on an identifier associated with a tone generator and a frequency occurring within a range of frequencies in use by a digital subscriber line modem to provide a service via a digital subscriber line, the tone transmitted by the tone generator located at a network interface device, the tone generator distinct from the digital subscriber line modem;
verifying a signal power of the tone is lower than a power associated with the service; and demodulating the tone to obtain a subscriber loop identifier and to identify a subscriber and the digital subscriber line modem.

12. A method as defined in claim 11, wherein the tone is at least one of amplitude modulated, phase modulated, or code-division multiple-access modulated.

13. A method as defined in claim 11, further comprising estimating a length of the passive optical network subscriber line based on the analyzed tone.

14. A method as defined in claim 13, further comprising storing the subscriber loop identifier and the estimated length in a database.

15. A method as defined in claim 11, further comprising:
measuring a second power of a second tone received on the digital subscriber line while the digital subscriber line modem is providing the service; and
estimating the length based on the measured power and the second measured power.

16. A method as defined in claim 11, wherein the tone is received at a central office.

17. A machine readable storage device comprising instructions which, when executed, cause a machine to perform operations comprising:
accessing a tone via an optical coupler, the tone having a first amplitude based on an identifier associated with a tone generator and a frequency occurring within a range of frequencies in use by a digital subscriber line modem to provide a service via a digital subscriber line, the tone transmitted by the tone generator located at a network interface device, the tone generator distinct from the digital subscriber line modem;
verifying a signal power of the tone is lower than a power associated with the service; and
demodulating the tone to obtain a subscriber loop identifier to identify a subscriber and the digital subscriber line modem.

18. A machine readable storage device as defined in claim 17, wherein the instructions, when executed, cause the machine to estimate a length of the digital subscriber line based on the tone.

19. A machine readable storage device as defined in claim 18, wherein the instructions, when executed, cause the machine to store the identifier and the estimated length in a database.

20. A machine readable storage device as defined in claim 17, wherein the instructions, when executed, cause the machine to:
measure a second power of a second tone received on the digital subscriber line while the digital subscriber line modem is providing the service; and
estimate the length based on the measured power and the second measured power.

* * * * *

UNITED STATES PATENT AND TRADEMARK OFFICE
CERTIFICATE OF CORRECTION

| | | |
|---|---|---|
| PATENT NO. | : 8,687,771 B2 | Page 1 of 1 |
| APPLICATION NO. | : 13/711862 | |
| DATED | : April 1, 2014 | |
| INVENTOR(S) | : Wang et al. | |

It is certified that error appears in the above-identified patent and that said Letters Patent is hereby corrected as shown below:

Title page (73) Assignee: Replace "Intellectutal" with --Intellectual--

Signed and Sealed this
Eighth Day of March, 2016

Michelle K. Lee
*Director of the United States Patent and Trademark Office*